US009648905B2

(12) United States Patent
Levitz et al.

(10) Patent No.: US 9,648,905 B2
(45) Date of Patent: May 16, 2017

(54) SMOKING SYSTEM (71) Applicant: SIS Resources Ltd., Beit Shemesh (IL)

(72) Inventors: Robert Levitz, Beit Shemesh (IL); Eyal Peleg, Zoran (IL)

(73) Assignee: SIS Resources LTD., Beit Shemesh (IL)

( * ) Notice: Subject to any disclaimer, the term of this patent is extended or adjusted under 35 U.S.C. 154(b) by 439 days.

(21) Appl. No.: 14/229,014

(22) Filed: Mar. 28, 2014

(65) Prior Publication Data

US 2014/0202472 A1    Jul. 24, 2014

Related U.S. Application Data (63) Continuation of application No. PCT/IB2012/055287, filed on Oct. 3, 2012.

(Continued)

(51) Int. Cl.
*A24F 13/04* (2006.01)
*A24F 13/22* (2006.01)
(Continued)

(52) U.S. Cl.
CPC .............. *A24F 13/22* (2013.01); *A24F 13/00* (2013.01); *A24F 47/008* (2013.01)

(58) Field of Classification Search
CPC ...... A24F 1/16; A24F 1/06; A24F 1/08; A24F 1/12; A24F 1/14; A24F 47/002–47/008;
(Continued)

(56) References Cited

U.S. PATENT DOCUMENTS 3,519,000 A    7/1970 Houser
3,601,131 A *  8/1971 Reggio ..................... A24F 1/22
                                                      131/198.2

(Continued)

FOREIGN PATENT DOCUMENTS

CN    201061259 Y    5/2008
CN    101557728 A    10/2009
(Continued)

OTHER PUBLICATIONS

English translation of Japanese Office Action mailed Jun. 10, 2016.
(Continued)

*Primary Examiner* — Michael H Wilson
*Assistant Examiner* — Yana B Krinker
(74) *Attorney, Agent, or Firm* — Harness, Dickey & Pierce, P.L.C.

(57) ABSTRACT

In an electronic cigarette of the sort having a housing, a power section, and an atomizer, at least a portion of a first flow stream passes through the atomizer. A mixing valve within the housing has a first input that receives the first flow stream, and a second input receiving a second flow stream (20) that avoids the atomizing element, and an output (34) connected in fluid continuity to the opening in the proximal end, wherein the output conducts a mixture of the first flow stream (25) and the second flow stream (20). The apparatus further includes a regulating element (42) for the mixing valve in order to control a composition of the mixture.

17 Claims, 6 Drawing Sheets

Related U.S. Application Data (60) Provisional application No. 61/543,841, filed on Oct. 6, 2011.

(51) Int. Cl.
*A24F 13/00* (2006.01)
*A24F 47/00* (2006.01)

(58) Field of Classification Search
CPC .......... A24F 13/00; A24F 13/02; A24F 13/04; A24F 13/06; A24F 13/22; A24F 27/00; A24F 27/03
USPC ....... 131/198.2, 215.1, 215.3, 216, 187, 175
See application file for complete search history.

(56) References Cited

U.S. PATENT DOCUMENTS

| | | | |
|---|---|---|---|
| 3,677,269 A * | 7/1972 | Hudson | A24F 25/00 131/302 |
| 4,327,748 A | 5/1982 | Divis | |
| 5,388,594 A | 2/1995 | Counts et al. | |
| 5,551,449 A | 9/1996 | Huang | |
| 7,726,320 B2 | 6/2010 | Robinson et al. | |
| 2008/0092912 A1 | 4/2008 | Robinson et al. | |
| 2013/0319440 A1 | 12/2013 | Capuano | |
| 2014/0034071 A1 | 2/2014 | Levitz et al. | |

FOREIGN PATENT DOCUMENTS

| | | |
|---|---|---|
| CN | 101756352 A | 6/2010 |
| EP | 1 736 065 | 12/2006 |
| EP | 2110033 A1 | 10/2009 |
| EP | 2319334 A1 | 5/2011 |
| JP | S48-044270 | 12/1974 |
| JP | S49-051718 | 11/1975 |
| JP | S55-122379 U | 3/1982 |
| JP | S60-195684 U | 12/1985 |
| JP | S64-005480 | 1/1989 |
| JP | S64-055170 | 3/1989 |
| JP | 2001-514940 A | 9/2001 |
| JP | 2010-506594 A | 3/2010 |
| JP | 2010-104310 A | 5/2010 |
| JP | 2011-515080 A | 5/2011 |
| KZ | 11053 B | 12/2001 |
| RU | 2132629 C1 | 7/1999 |
| WO | WO-97/48293 A1 | 12/1997 |
| WO | WO-99/08737 | 2/1999 |
| WO | WO-2008/133091 A1 | 11/2008 |
| WO | WO-2010/133342 A1 | 11/2010 |
| WO | WO-2010/145468 A1 | 12/2010 |
| WO | WO-2011/009920 A1 | 1/2011 |
| WO | WO-2012117578 A1 | 9/2012 |

OTHER PUBLICATIONS

Office Action for corresponding Chinese application No. 201280049408.7 dated Aug. 14, 2015.
Search Report for corresponding European Application No. 12839026.7 dated Jun. 12, 2015.
International Search Report mailed Jan. 31, 2013 for PCT Application No. PCT/IB2012/055287 (4 pp.).

* cited by examiner

SMOKING SYSTEM

PRIORITY

This application claims priority to PCT Application No. PCT/IB2012055287 (Int'l Pub. No. WO2013/050934), filed on Oct. 3, 2012, entitled "SMOKING SYSTEM," which claims priority to U.S. Provisional No. 61/543,841, filed on Oct. 6, 2011, each of which are herein incorporated by reference.

FIELD OF INVENTION

This disclosure relates to tobacco product alternatives. More particularly, this disclosure relates to a smoking device for limiting exposure to smoke fumes produced through combustion, for example tobacco combustion.

BACKGROUND

Tobacco-containing smoking devices are known. For example from U.S. Pat. No. 7,726,320, which is herein incorporated by reference, and which proposes a cigarette incorporated within an electrically powered aerosol generating device that acts as a holder for that cigarette. The smoking article possesses at least one form of tobacco. The smoking article also possesses a mouth-end piece that is used by the smoker to inhale components of tobacco that are generated by the action of heat upon components of the cigarette. A representative smoking article possesses an outer housing incorporating a source of electrical power (e.g., a battery), a sensing mechanism for powering the device at least during periods of draw, and a heating device (e.g., at least one electrical resistance heating element) for forming a thermally generated aerosol that incorporates components of tobacco. During use, the cigarette is positioned within the device, and after use, the used cigarette is removed from the device and replaced with another cigarette.

European patent document EP 1 736065, herein incorporated by reference, proposes an electronic cigarette containing nicotine without tar, which includes a shell and a suction nozzle. On the exterior wall of the shell, there is an air orifice, while there is an electronic circuit board, a constant pressure cavity, a sensor, a gas liquid separator, an atomizer, and a supplying bottle orderly located in the interior of the shell, wherein the electronic circuit board consists of an electronic switching circuit and a high-frequency generator. At one side of the sensor there is an air duct. A negative pressure cavity is located in the sensor. The atomizer connects with the supplying bottle, and there is an atomizing cavity located in the atomizer.

SUMMARY

There is provided according to embodiments of the invention a smoking apparatus, sometimes referred to as an electronic cigarette or e-cigarette. A distal opening of the apparatus admits a first flow stream, and a proximal end has an opening to allow egress of fluid flow therethrough into a mouth of a smoker. The apparatus further includes a power section in a housing, an atomizer section accepting an aerosol-forming material and an atomizing element. The atomizing element is energized by a power element in the power section, wherein at least a portion of the first flow stream passes through the atomizer section and acquires an aerosol from the atomizing element therein. A mixing valve within the housing has a first input that receives the first flow stream, a second input receiving a second flow stream that avoids the atomizing element, and an output connected in fluid continuity to the opening in the proximal end, wherein the output conducts a mixture of the first flow stream and the second flow stream. The apparatus further includes a regulating element for the mixing valve in order to control a composition of the mixture.

According to one aspect of the smoking apparatus, the distal opening is adapted to receive a cigarette therein and the first flow stream carries a flow of smoke of the cigarette. The housing has an external vent formed therethrough, and the second input of the mixing valve is connected to the vent. The second flow stream includes ambient air drawn through the vent.

In an aspect of the smoking apparatus the first flow stream comprises ambient air drawn through the distal opening and the body of the housing has an external vent formed therethrough. The smoking apparatus includes a mounting adapter for docking a portion of a cigarette alongside the housing, so that a proximal end of the cigarette is in fluid communication with the vent, and the second flow stream includes cigarette smoke of the docked cigarette that is drawn through the vent.

According to yet another aspect of the smoking apparatus, the mixing valve is disposed upstream from the atomizing element, and the mixture of the first flow stream and the second flow stream passes through the atomizer section.

According to still another aspect of the smoking apparatus, the mixing valve is disposed downstream from the atomizing element and only one of the first flow stream and the second flow stream passes through the atomizer.

According to a further aspect of the smoking apparatus, the power element includes a super-capacitor. The mixing valve may be a ball valve, a shutter valve, a diaphragm valve or a hinge valve.

There is further provided according to embodiments of the invention a smoking apparatus, having a housing, a proximal end and a distal opening that admits a first flow stream, the proximal end having an opening to allow egress of fluid flow therethrough into a mouth of a smoker. The apparatus further includes a power section in the housing, an atomizer section accepting an aerosol-forming material and an atomizing element. The atomizing element is energized by a power element in the power section, wherein at least a portion of the first flow stream passes through the atomizer section and acquires an aerosol from the atomizing element therein, and wherein a second flow stream divides from the first flow stream upstream from the atomizing element and bypasses the atomizing element. The apparatus further includes a mixing valve within the housing that is disposed downstream from the atomizing element, and which has a first input that receives the first flow stream, a second input that receives the second flow stream, an output connected in fluid continuity to the opening in the proximal end, wherein the output conducts a mixture of the first flow stream and the second flow stream, and a regulating element for the mixing valve to control a composition of the mixture.

According to one aspect of the smoking apparatus, the distal opening is adapted to receive a cigarette therein and the first flow stream carries a flow of smoke of the cigarette.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily. Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
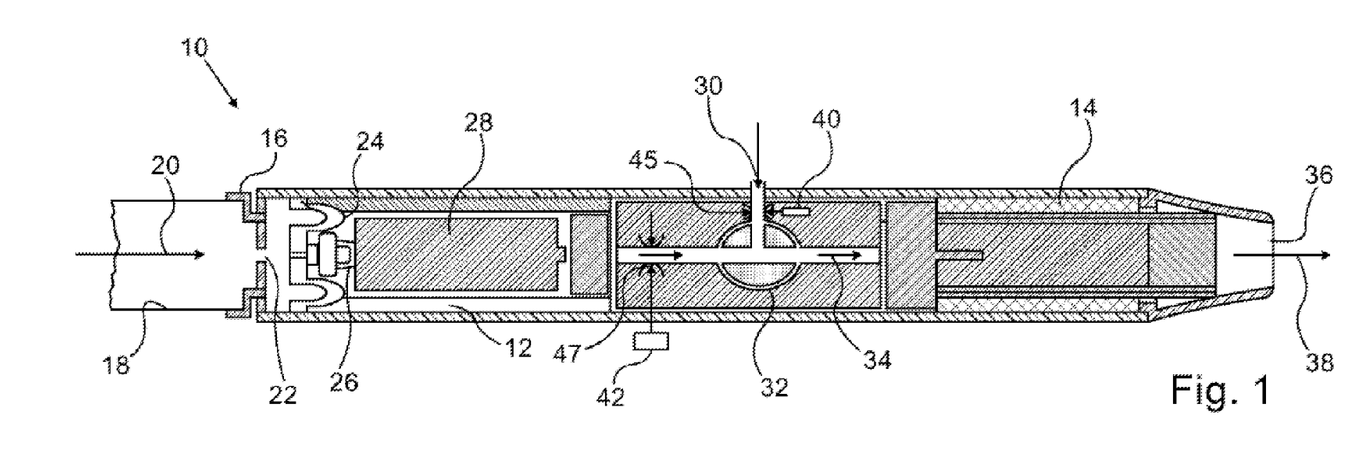
FIG. 1 is a semi-schematic diagram of a smoking device in accordance with an embodiment of the invention.

Turning now to the drawings, reference is initially made to FIG. 1, which is a semi-schematic diagram of a smoking device 10 in accordance with an embodiment of the invention. Device 10 has a battery section 12. The battery section 12 may include power controls. Suitable power controls are disclosed in U.S. Provisional Application No. 61/441,133 (now U.S. Pat. Pub. No. 2013-0319440 A1), which is herein incorporated by reference. The device 10 includes a section 14, containing an atomizer and an aerosolizable liquid or gel, sometimes referred to herein as an "e-liquid", which typically contains a mixture of propylene glycol, vegetable glycerin, flavorings, and optionally contains nicotine. The atomizer is essentially a heating element, powered by a battery in the battery section 12. When powered, the atomizer acts on the liquid or gel. The components of the section 14 may be provided as separate components, or may be integral, as taught in U.S. Provisional Application No. 61/474,569 (now U.S. Pat. Pub. No. 2014-0034071), which is herein incorporated by reference. In the latter case, the section 14 is known as a "cartomizer."

An adapter 16 for receiving a tobacco-containing unit 18 is disposed at one end of the device 10 in a longitudinal fashion, so that the device 10, when docked with the unit 18, may appear to observers as an actual cigarette. The unit 18 may be a cigarette, a nicotine pack or cartridge, a hookah, or other source of tobacco fumes. In any case, a first air intake for receiving tobacco fumes is represented by arrow 20. When smoke enters the device 10, an aperture 22 constricts the flow, thereby creating a pressure differential, which is sensed by an airflow sensor 24 of known type. It is desirable to minimize the flow resistance, for example by minimizing flow constriction, in order that that the user experiences a feeling of smoking an actual cigarette. There is a tradeoff, however, in that the energy transmitted by pressure differences resulting from the inhalation is used to create the atomizer action. For a given pressure difference and flow conditions the ability to release droplets is also dependent on the viscosity of e-liquid. E-cigarettes use a high viscosity liquid that is converted to a low viscosity by heating.

Electronic circuitry 26 linked to the sensor 24 activates a heating device that enable viscosity reduction and thus activation of the atomizer in the section 14. Part of this electronic circuitry is a pressure or flow sensor, which switches a power source when the smoker starts inhaling. The circuitry 26 is powered, typically by an electrical power source (single use or rechargeable), for example, a lithium ion battery 28, other known type of rechargeable battery, or alternatively by a super capacitor. Additionally or alternatively, the aperture 22 may be manually controlled by the user by pressing a button (not shown), which can be mounted on the shaft of the device 10. For convenience, the device 10 may be configured similarly to a pistol, the actuating button corresponding to the trigger.

A second air intake is formed through the device 10 as a side vent 30. The vent 30 may be created in several ways, for example as a longitudinal notch, a hole bored through the shaft of the device 10, or formed in an adapter connecting the section 14 and the battery section 12 as taught in the above noted U.S. Provisional Application No. 61/474,569.

A regulated three-way mixing valve 32 accepts air inflow via the first air intake (arrow 20) and from the second air intake (vent 30). Air exiting the valve 32 represented by arrow 34 contains a mixture of the two inflows in any desired proportion. The inflows may be controlled at constriction points 45, 47. As a result the user inhales, through oral adaptor 36 (arrow 38) an air mixture containing from 0-100 percent tobacco fumes.

The valve 32 may be programmed by electronic circuitry 40 within the device 10. For example, initial puffs may contain 100% tobacco fumes. Thereafter the valve adjusts automatically to limit the proportion of smoke. Alternatively, a control 42 may be provided for the user to manually adjust the valve 32.

The circuitry 40 or the circuitry 26 may disable the atomizer in the section 14 when the proportion of tobacco fumes exceeds a predefined threshold.

The valve 32, vent 30, air flow sensor 24, and other components need not be positioned as shown. For example they may be relocated upstream in the first air flow, and be placed before the battery 28. Other locations are possible, but in any case the user inhales a desired proportion of air and tobacco fumes. In some embodiments, a conventional cigarette may be smoked in combination with or in alternation with the e-cigarette. In such cases the air stream resulting from the conventional cigarette should be diverted to bypass the atomizer, as explained below.

Alternate Embodiment 1

Figure 2:
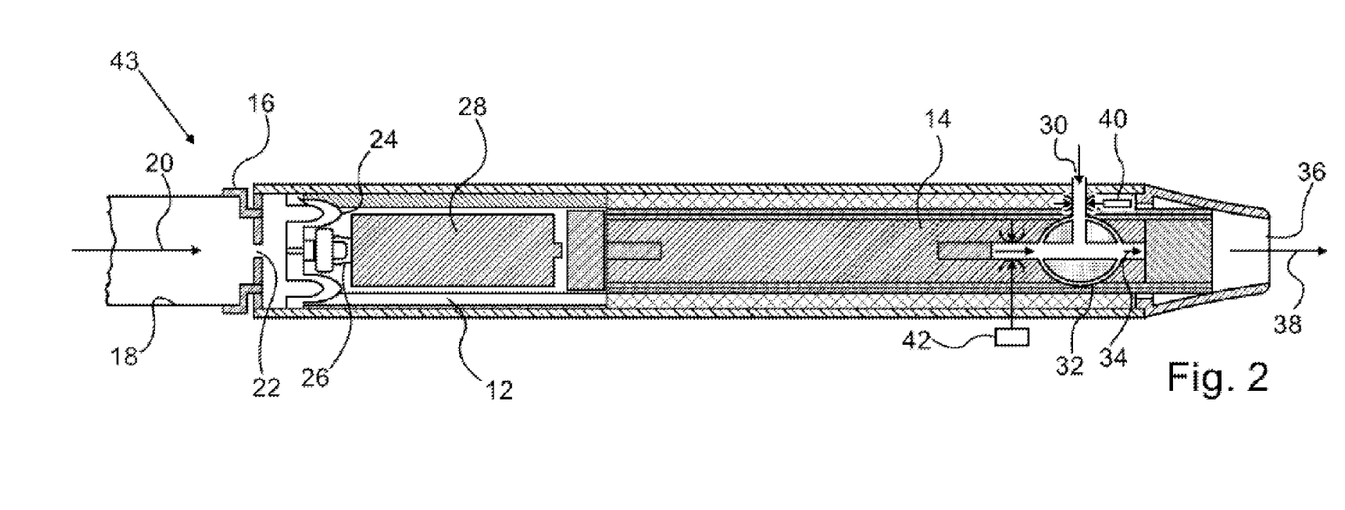
FIG. 2 is a semi-schematic diagram of a smoking device in accordance with an alternate embodiment of the invention.

Reference is now made to FIG. 2, which is a semi-schematic diagram of a smoking device 64 in accordance with an alternate embodiment of the invention. The general construction of the smoking device 64 is similar to the device 10 (FIG. 1). However the valve 32 is disposed downstream (in the direction of inhaled airflow) from the atomizer in the section 14.

Alternate Embodiment 2

The battery 28, particularly when realized as a lithium ion battery, has several disadvantages. Charging and discharging must be carefully regulated. In addition, precautions must be taken to prevent contact with liquid in the section 14, should leakage occur. Indeed, under some circumstances the battery 28 could be a fire hazard. In addition, charging times limit the utility of the device 10, or may require the user to carry duplicates of the battery section 12 or the battery 28.

Figure 3:
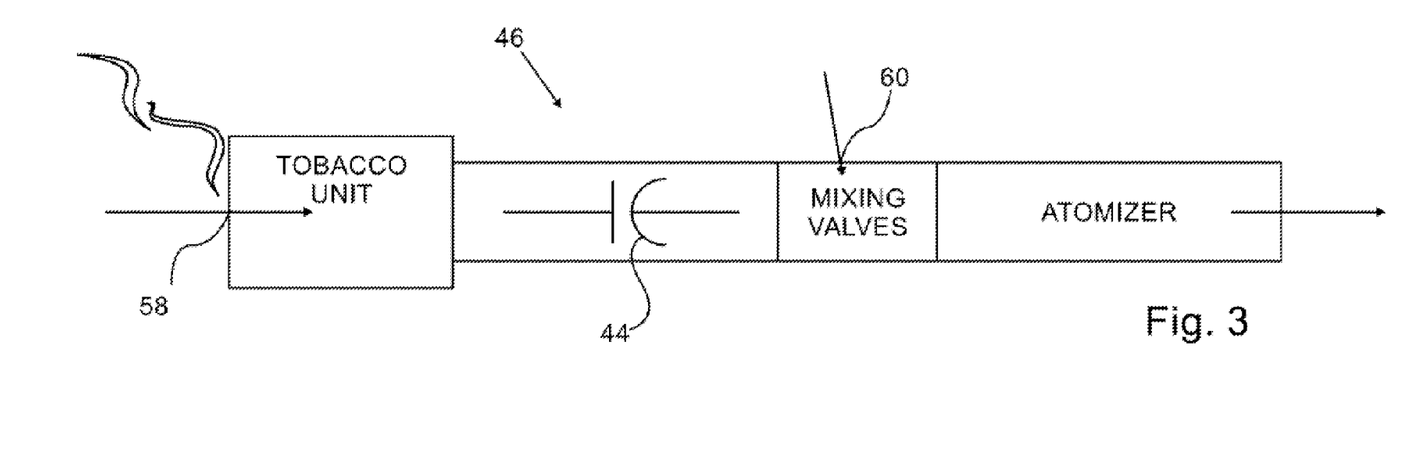
FIG. 3 is a semi-schematic diagram of a smoking device showing a power supply element in accordance with an alternate embodiment of the invention.

Reference is now made to FIG. 3, which is a schematic diagram of a smoking device 46 in accordance with an alternate embodiment of the invention. In this embodiment, the battery 28 is replaced by a super capacitor 44, which can be charged within seconds by connection to ordinary house power. The device 46 is provided with intakes 58, 60 for air and tobacco fumes. The capacitance of the capacitor 44 is sufficient to power the atomizer for a desired number of usages before it discharges.

Alternate Embodiment 3

Figure 4:
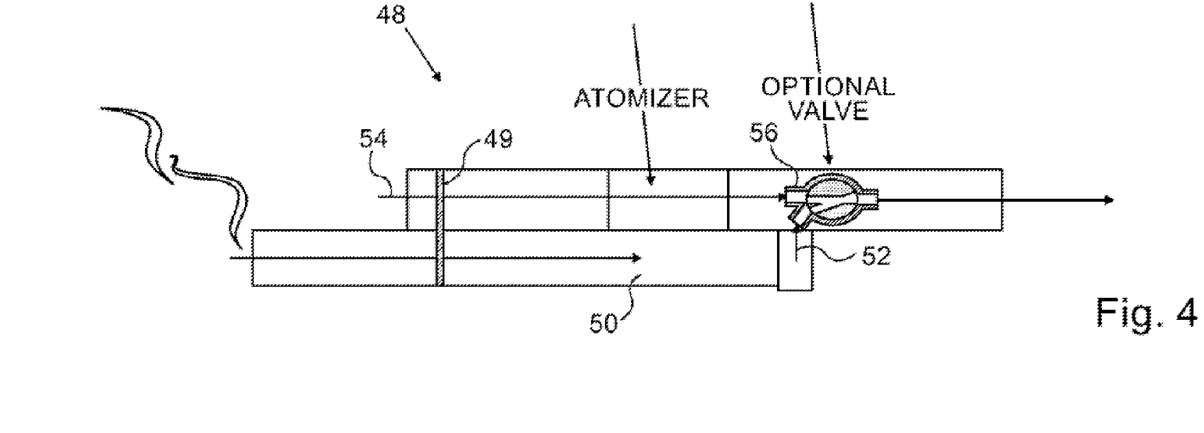
FIG. 4 is a semi-schematic diagram of a smoking device in accordance with an alternate embodiment of the invention.

Reference is now made to FIG. 4, which is a schematic diagram of a smoking device 48 in accordance with an alternate embodiment of the invention. In this embodiment, the device 48 has a mounting adapter 49 for docking a portion of a conventional cigarette 50 or other source of tobacco fumes longitudinally alongside the housing. The smoke enters through a side vent as described above (arrow 52). Ambient air enters through a distal end intake (arrow 54), both reaching mixing valve 56. It will be noted that an air stream represented by arrow 54 passes through an atomizer 57, while the air stream from the cigarette 50 does not enter the atomizer 57.

Alternate Embodiment 4

Figure 5:
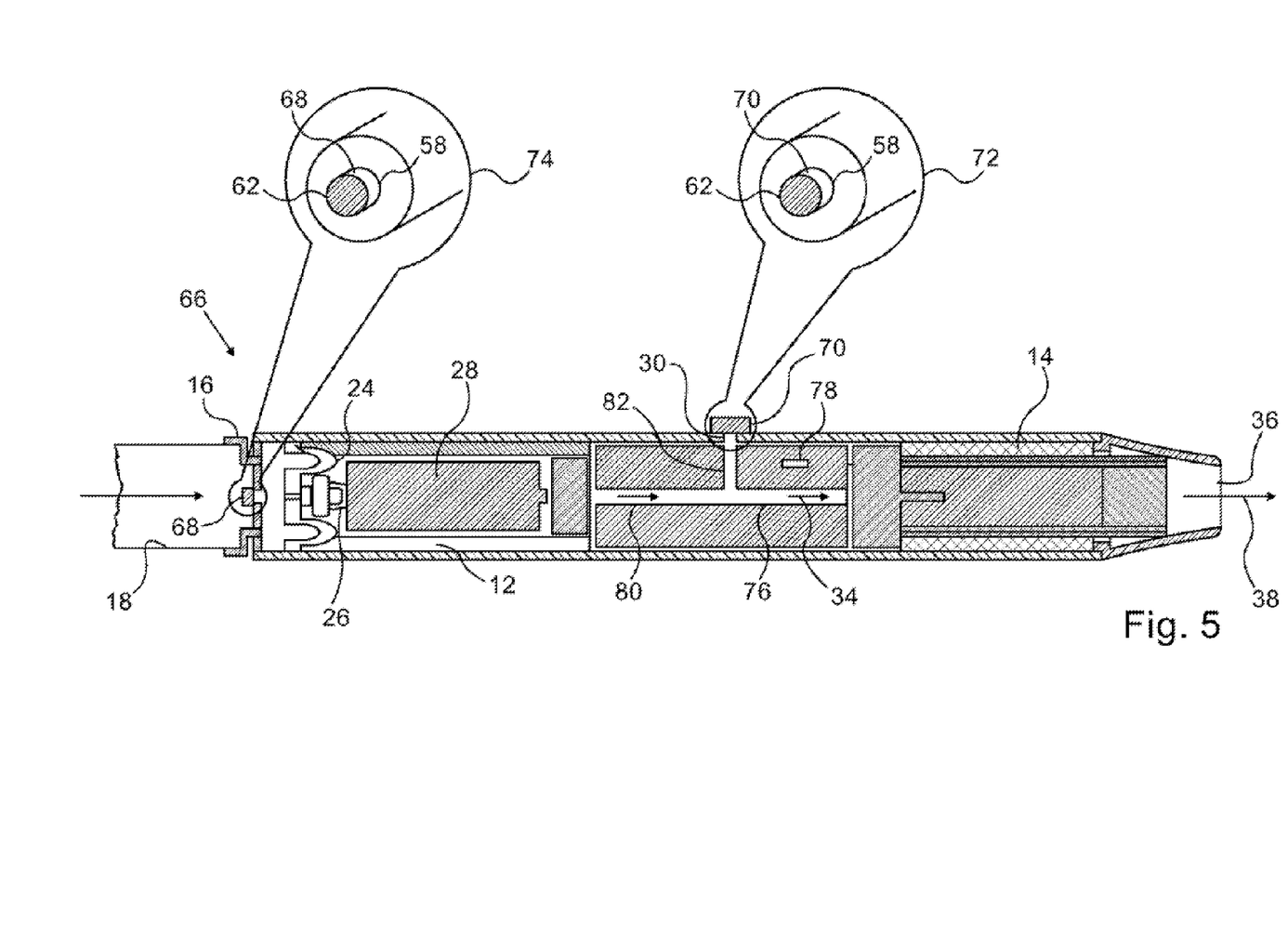
FIG. 5 is a semi-schematic diagram of a smoking device in accordance with an alternate embodiment of the invention.

In this embodiment the air intake is regulated by valves at the intakes, or alternatively, by a mixing valve located at the intake, which can be an electronically controlled valve, or any other type of valve as explained elsewhere herein. Reference is now made to FIG. 5, which is a semi-schematic diagram of a smoking device 66 in accordance with an alternate embodiment of the invention. In this embodiment, the aperture 22 (FIG. 1) has been replaced by a shutter valve 68. The vent 30 is guarded by another shutter valve 70. The shutter valves 68, 70 have the same construction, as best seen in balloons 72, 74. Alternatively, the two shutter valves may differ in construction. In any case, the combined flows exit toward the oral adaptor 36 via outlet tube 76 as shown by the arrow 34.

In the shutter valves 68, 70, an air shutter 62 is slidable over intake 58 to restrict air flow therethrough. The shutter 62 may be controlled manually by the user, or automatically by a controller 78 to adjust the relative flows through inlet tubes 80, 82. The shutters shown in FIG. 5 are exemplary. Other closure arrangements, e.g., hinged valves, electronically controlled valves, cam driven piston valves, can be substituted for the shutter valves 68, 70. Several such alternatives are described in the embodiments below. Indeed the shutter valves 68, 70 can be used as regulatory elements in the valve 32 (FIG. 1).

Alternate Embodiment 5

Figure 6:
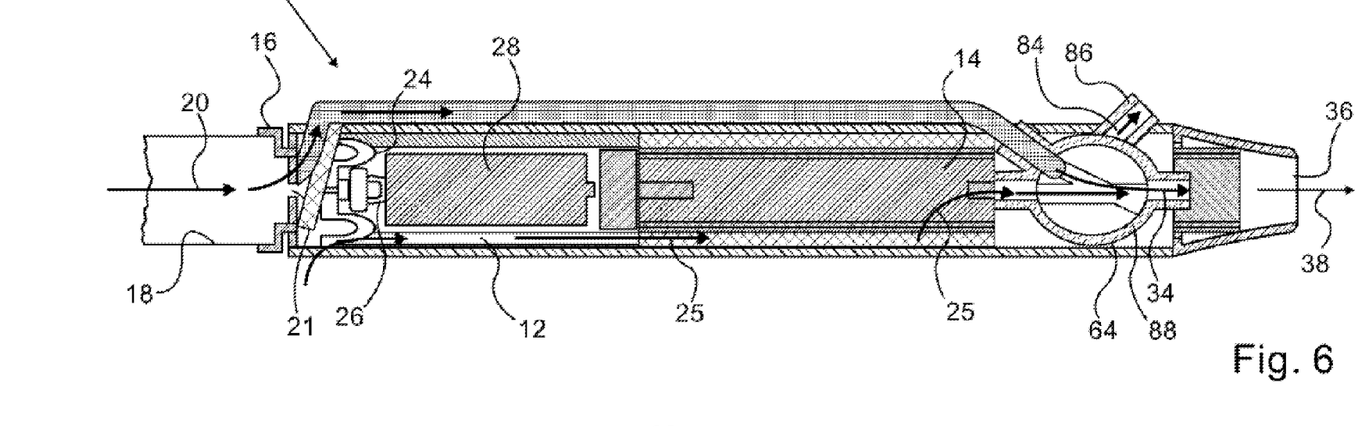
FIG. 6 is a semi-schematic diagram of a smoking device in accordance with an alternate embodiment of the invention.

Reference is now made to FIG. 6, which is a semi-schematic diagram of a smoking device 84, in accordance with an alternate embodiment of the invention. In this embodiment the valve 32 (FIG. 1) is realized as a ball valve 64, in which air outflow may be allocated in any desired proportion between an outlet 86 leading to a vent 88 and an outlet 90 leading toward the oral adaptor 36. Ball valves typically have low maintenance costs. In addition to affording quick, quarter-turn on-off operation, ball valves are compact, require no lubrication, and give tight sealing with low torque. However, they have relatively poor throttling characteristics. In a throttling position, the partially exposed seat is vulnerable to erosion because of the impingement of high velocity flow.

A first air stream, represented by arrows 20, is diverted from the atomizer by shutter valve 23, and reaches the ball valve 64. A second air stream, represented by arrows 25 enters via aperture 21, passes through the atomizer 57 and thence to the ball valve 64. Thus mixing occurs in the ball valve 64 downstream from the atomizer 57, after it has acted on the second air stream.

Figure 7:
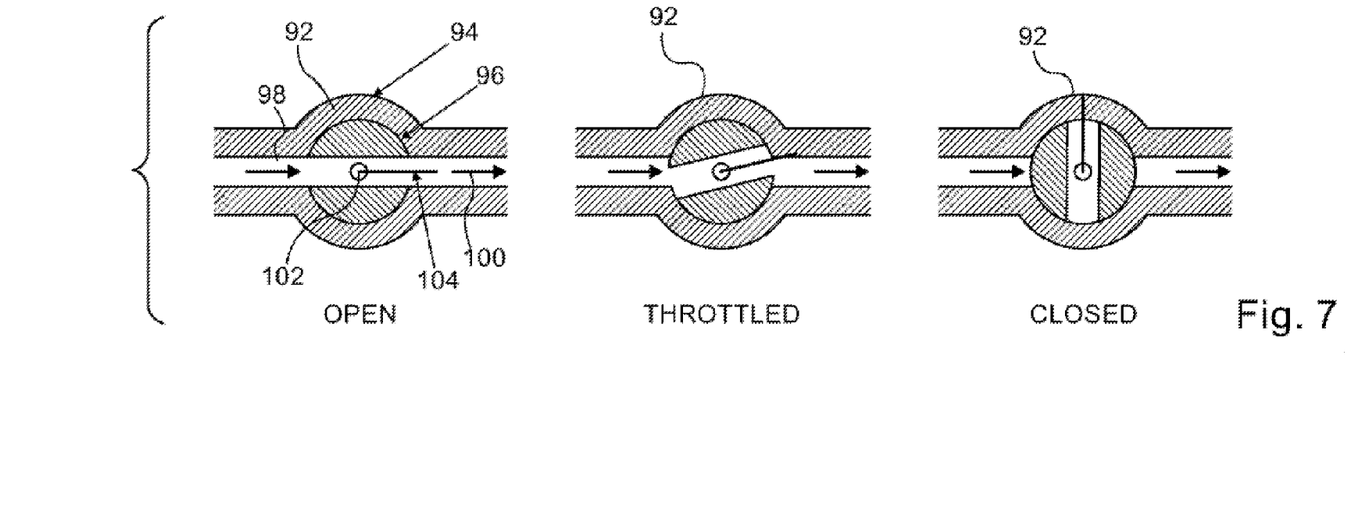
FIG. 7 is a schematic diagram of illustrating operation of a simplified ball valve that facilitates understanding of the embodiment shown in FIG. 6.

Reference is now made to FIG. 7, which is a schematic diagram of illustrating operation of a simplified ball valve 92 that facilitates understanding of the ball valve 64 (FIG. 6), in accordance with an embodiment of the invention. Fluid flow direction is indicated by the arrows in FIG. 7. From left to right, the ball valve 92 is shown in open, throttled, and closed positions, respectively.

The ball valve 92 has a body 94 and a ball 96, an inlet 98 and a single outlet 100. In this respect the ball valve 92 is unlike the ball valve 64, which has two outlets 86, 90. The ball 96 rotates about an axis 102, under control of an actuator 104.

Alternate Embodiment 6

Figure 8:
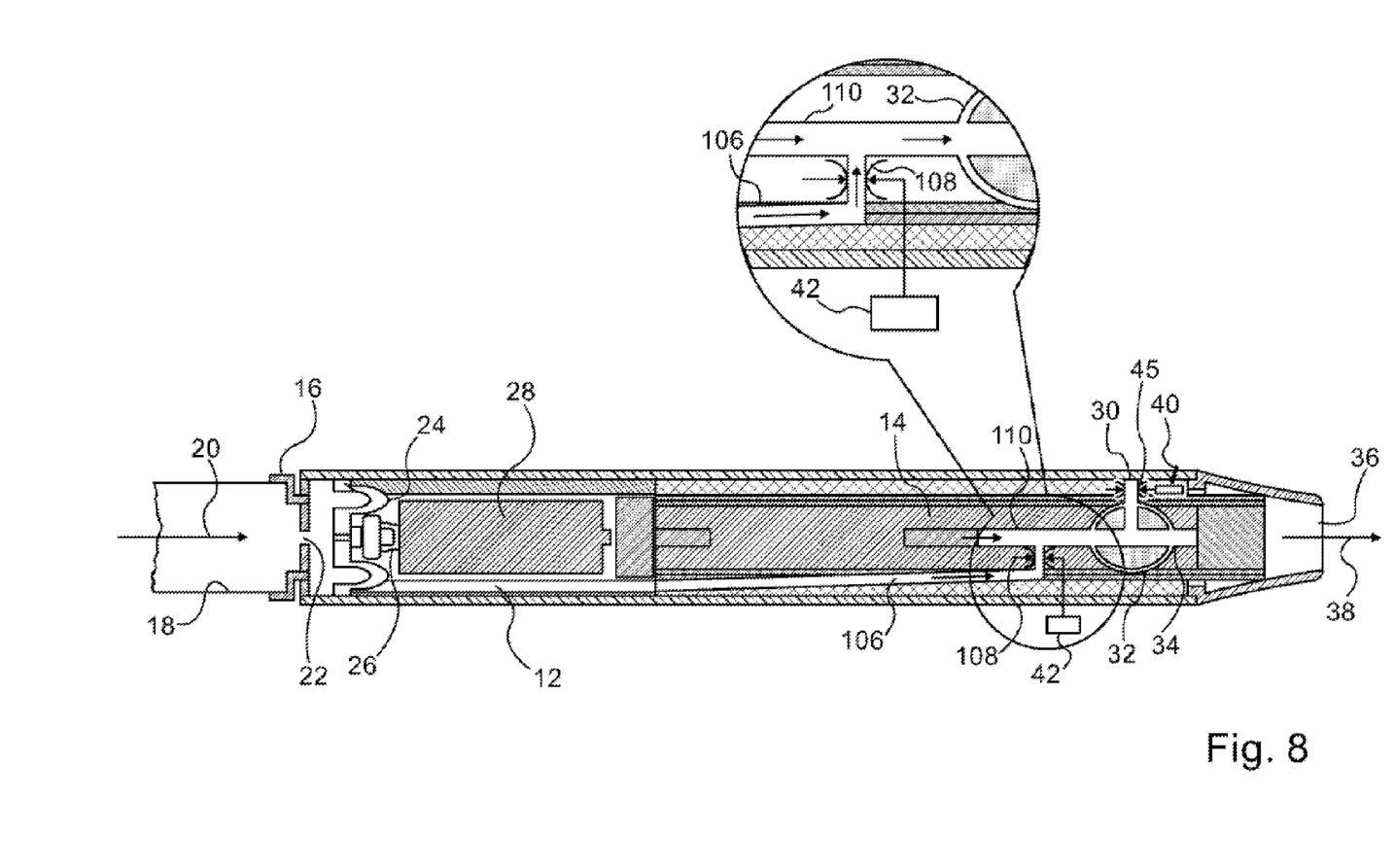
FIG. 8 is a semi-schematic diagram of a smoking device in accordance with an alternate embodiment of the invention.
Figure 9:
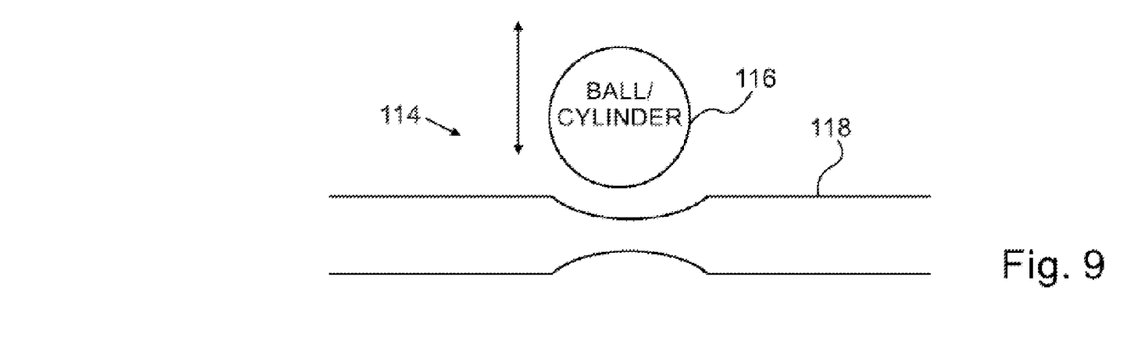
FIG. 9 is a schematic diagram of a valve in accordance with an embodiment of the invention.
Figure 10:
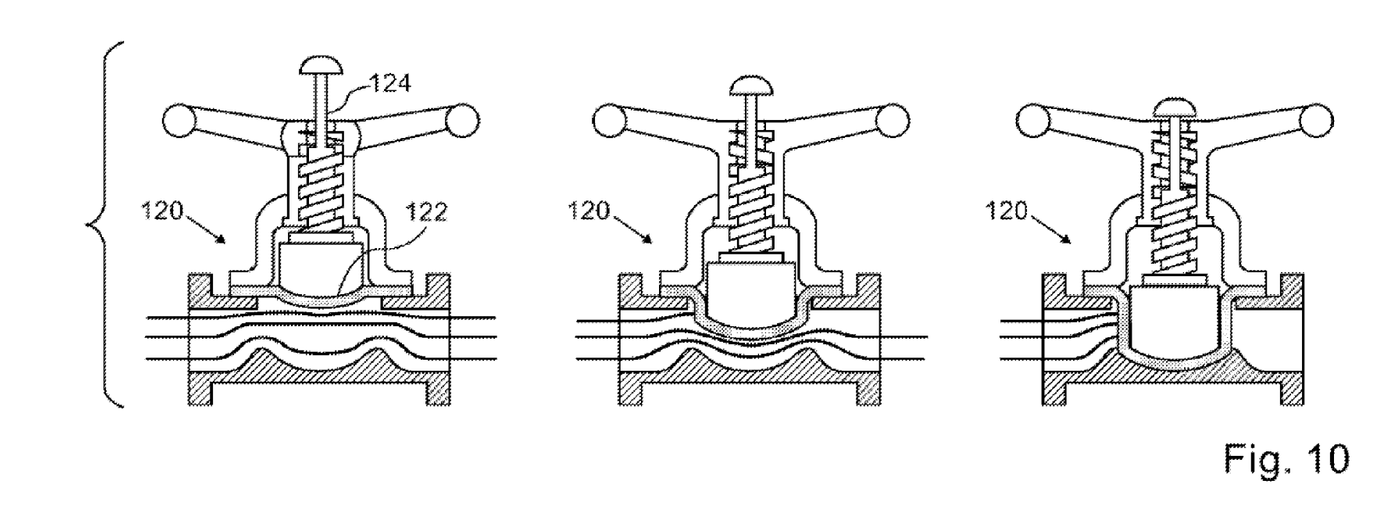
FIG. 10 is a schematic diagram of a diaphragm valve, in accordance with an embodiment of the invention.

Reference is now made to FIG. 8, which is a semi-schematic diagram of a smoking device, in accordance with an alternate embodiment of the invention. In this embodiment, mixing occurs after a portion of the airflow has passed through the atomizer. A bypass tube 106 transmits a proportion of the air flow, the proportion being regulated by the control 42 at a constriction point 108, while the remainder of the airflow passes through the atomizer via tube 110, as shown by arrow 112. When the constriction point 108 is fully open, the atomizer offers greater flow resistance than the bypass tube 106, and most of the flow passes through the bypass tube 106. Actuating the control 42 constrains flow through the bypass tube 106 at the constriction point 108, so that a greater proportion of the flow arrives at the vent 30 by passing through the atomizer and the tube 110. Providing a parallel flow circuit via the bypass tube 106 allows the total flow resistance to be lowered. The arrangement shown schematically in FIG. 8 may be applied, mutatis mutandis, to any of the other embodiments disclosed herein.

Alternate Embodiment 7

Reference is now made to FIG. 9, which is a schematic diagram of a valve 114 in accordance with an embodiment of the invention. The valve 114 can be employed in the various embodiments herein, for example at the constriction points 108, 45 (FIG. 8). Movement of a ball (or cylinder) 116 against the wall of a tube 118 produces compression and increases flow resistance.

Alternate Embodiment 8

Reference is now made to FIG. 10, which is a schematic diagram of a diaphragm valve 120, in accordance with an embodiment of the invention, wherein displacement a diaphragm 122 by an actuator 124 into the flow throttles or obstructs the flow entirely. From left to right the diaphragm valve 120 is shown in open, throttled, and closed positions, respectively. The diaphragm valve 120 can be used in the various embodiments herein, for example at the constriction points 108, 45 (FIG. 8).

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. An aerosol generating device, comprising:

a housing having a body, a proximal end and a distal opening that admits a first flow stream, the proximal end having an opening to allow egress of fluid flow therethrough;

a power section in the housing;

an aerosol generating section accepting an aerosol-forming material and an aerosol generating element, the aerosol generating element being energized by a power element in the power section, wherein at least a portion of the first flow stream passes through the aerosol generating section and acquires an aerosol from the aerosol generating element therein;

a mixing valve within the housing having a first input that receives the first flow stream, a second input receiving a second flow stream that avoids the aerosol generating element, and an output connected in fluid continuity to the opening in the proximal end, wherein the output conducts a mixture of the first flow stream and the second flow stream; and an electronic circuitry configured to program the mixing valve so as to control a composition of the mixture.

2. The aerosol generating device according to claim 1, wherein the distal opening is configured to receive a cigarette therein and the first flow stream carries a flow of smoke of the cigarette, and wherein the body of the housing has an external vent formed therethrough, the second input of the mixing valve being connected to the vent, and the second flow stream comprising ambient air drawn through the vent.

3. The aerosol generating device according to claim 1, wherein the first flow stream comprises ambient air drawn through the distal opening and the body of the housing has an external vent formed therethrough, the aerosol generating device further comprising:

a mounting adapter configured to docking a portion of a cigarette alongside the housing, so that a proximal end of the cigarette is in fluid communication with the vent, so that the second flow stream comprises cigarette smoke drawn through the vent.

4. The aerosol generating device according to claim 1, wherein the mixing valve is disposed upstream from the aerosol generating element, and the mixture of the first flow stream and the second flow stream passes through the aerosol generating section.

5. The aerosol generating device according to claim 1, wherein the mixing valve is disposed downstream from the aerosol generating element and only one of the first flow stream and the second flow stream passes through the aerosol generating section.

6. The aerosol generating device according to claim 1, wherein the power element comprises a super capacitor.

7. The aerosol generating device according to claim 1, wherein the mixing valve comprises a ball valve.

8. The aerosol generating device according to claim 1, wherein the mixing valve comprises a shutter valve.

9. The aerosol generating device according to claim 1, wherein the mixing valve comprises a diaphragm valve.

10. The aerosol generating device according to claim 1, wherein the mixing valve comprises a hinge valve.

11. A aerosol generating device, comprising:
a housing having a body, a proximal end and a distal opening that admits a first flow stream, the proximal end having an opening to allow egress of fluid flow therethrough;
a power section in the housing;
an aerosol generating section accepting an aerosol-forming material and an aerosol generating element, the aerosol generating element being energized by a power element in the power section, wherein at least a portion of the first flow stream passes through the aerosol generating section and acquires an aerosol from the aerosol generating element therein, and wherein a second flow stream divides from the first flow stream upstream from the aerosol generating element and bypasses the aerosol generating element;
a mixing valve within the housing disposed downstream from the aerosol generating element and having a first input that receives the first flow stream, a second input receiving the second flow stream, and an output connected in fluid continuity to the opening in the proximal end, wherein the output conducts a mixture of the first flow stream and the second flow stream; and
an electronic circuitry configured to program the mixing valve so as to control a composition of the mixture.

12. The aerosol generating device according to claim 11, wherein the distal opening is adapted to receive a cigarette therein and the first flow stream carries a flow of smoke of the cigarette.

13. The aerosol generating device according to claim 11, wherein the power element comprises a super-capacitor.

14. The aerosol generating device according to claim 11, wherein the mixing valve comprises a ball valve.

15. The aerosol generating device according to claim 11, wherein the mixing valve comprises a shutter valve.

16. The aerosol generating device according to claim 11, wherein the mixing valve comprises a diaphragm valve.

17. The aerosol generating device according to claim 11, wherein the mixing valve comprises a hinge valve.

* * * * *